Figure 1:
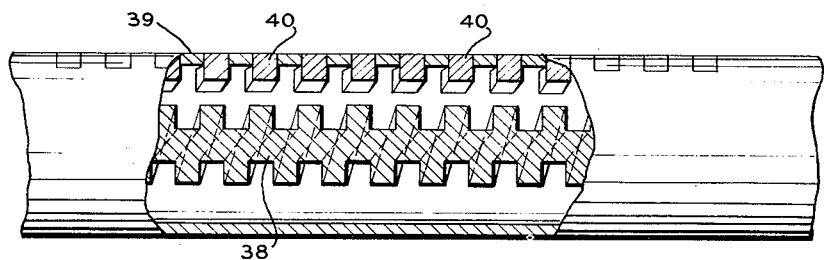

July 22, 1952  M. G. WHITE  2,604,594

ARRANGEMENT FOR VARYING WAVE LENGTHS IN COAXIAL LINES

Original Filed Oct. 2, 1943

INVENTOR
MILTON G. WHITE
BY Ralph L. Chappell
ATTORNEY

Patented July 22, 1952

2,604,594

UNITED STATES PATENT OFFICE 2,604,594

ARRANGEMENT FOR VARYING WAVE LENGTHS IN COAXIAL LINES

Milton G. White, Cambridge, Mass., assignor, by mesne assignments, to the United States of America as represented by the Secretary of the Navy Original application October 2, 1943, Serial No. 504,777. Divided and this application September 14, 1945, Serial No. 616,397

11 Claims. (Cl. 250—33.63)

1

This invention relates to the transmission of high-frequency electric oscillations and more particularly to the transmission of electric waves in wave guides and other such transmission apparatus. The invention is applicable both to coaxial-conductor wave guides and to hollow-pipe wave guides and concerns control of the wave length of traveling waves of a given frequency within such wave guides. This application is a division of my application Serial No. 504,777, filed October 2, 1943 and entitled "Control of Wave Lengths in Wave Guides," now Patent No. 2,567,748 granted September 11, 1951.

For many purposes it is desirable to modify the wave length. Sometimes, in addition to shortening the wave lengths, it is even desired to provide arrangements for varying, periodically or otherwise, the wave length of the oscillations in the wave guide. Simple shortening of the wave length can be accomplished by substituting solid dielectric material for the otherwise more convenient air insulation, but this method of shortening the wave length has certain disadvantages. If the dielectric material extends completely across the wave guide or even across a large portion of the wave guide, the accumulation of moisture or dirt on the surfaces of the various pieces of dielectric material involves an electrical breakdown hazard which is particularly serious on account of the fact that if a breakdown should occur, the dielectric, if it is of organic material as in the case of the dielectrics with the most desirable electrical qualities, will be carbonized and precipitate a permanent failure or at least a source of losses, and in some cases the dielectric may actually catch fire. Also, when the wave guide is filled or almost filled with solid dielectric material it becomes very difficult to provide arrangements for varying the wave length in the wave guide for a given frequency over any substantial range of wave lengths.

It is an object of the present invention to provide for shortening the wave length in wave guide structures by the provision of suitable structures in said wave guides. It is a further object of this invention to provide such wave length shortening without the use of solid dielectric material in any location of high electric stress and, in the general case, without the necessity of any solid dielectric material at all. It is a further object of this invention to provide means for varying at will within a substantial range the wave length of electric oscillations in a wave guide without varying the frequency thereof. It is a further object of the invention to provide a certain advantageous type of antenna system employing wave guides, in which the wave length of electric oscillations is controlled as aforesaid. Still a further object of the invention is to provide wave guides with shortened wave length characteristics with respect to waves transmitted therein which exhibit such characteristics in connection with the transmission of traveling waves under conditions of good energy transfer and low internal reflection and even in the substantial absence of standing waves.

Figure 2:
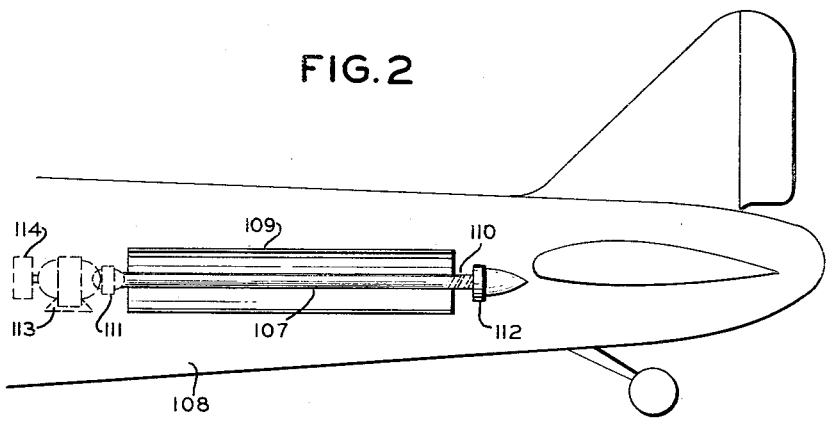
Figure 3:
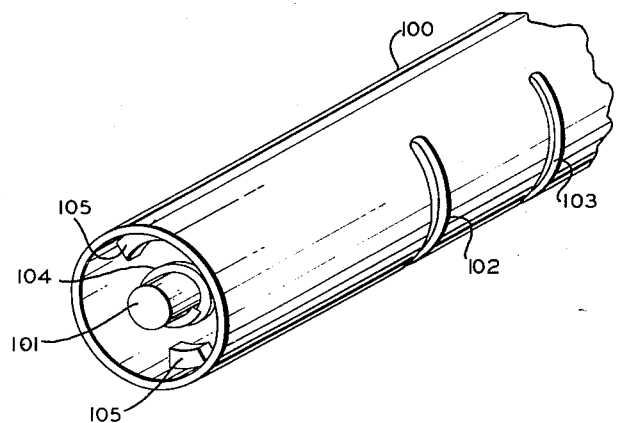

In accordance with the present invention, certain repeated obstructions relatively closed spaced in terms of the wave length are introduced or constructed in a wave guide, which so affect the field, as further explained below, that the wave length is shortened. A number of forms of such arrangements are possible and it is also possible to provide means for mechanically moving certain of the obstructions which means are capable of producing a variation in the shortening of the wave length, which is to say a variation in the wave length for a given frequency. The invention will be more fully explained in connection with the accompanying drawing in which:

Fig. 1 is a longitudinal cross section of a form of wave guide constructed in accordance with the present invention adapted for variation of the wave length of oscillations in the wave guide; and Fig. 2 is a general view and Fig. 3 is a detail of a form of antenna system making use of the present invention.

In Fig. 1 there is shown a coaxial-conductor wave guide in which the inner conductor is provided with ridges and grooves, the ridges and grooves being in the form of a continuous screw thread. The outer conductor of the wave guide shown in Fig. 1 is provided with spaced projections 40. These projections may be in a longitudinal row or in several staggered longitudinal rows, the projections being spaced by the spacing between turns of the screw thread on the inner conductor 38. If desired, the projections of the outer conductor 39 might also be provided in the coalesced form of a continuous screw thread, but because of the difficulty of preparing such a structure it is preferred to provide a row of obstructions, which might be regarded as a discontinuous screw thread, and which may be conveniently mortised into the outer conductor 39. Means may then be provided, (not shown) for rotating the inner conductor 38 on its axis, with the result that the configuration of the electric field of the transmitted oscillations may be made to vary according to the rotational position of the inner conductor 38. It is found that such variation results in variation of the wave length of oscillations of a given frequency transmitted in the wave guide. The wave length is shortest when the screw thread ridges on the inner conductor 38 are substantially in registry with the projections 40 and becomes less short as the said ridges and the said projections are displaced with respect to each other. The wave length change which accompanies the relative shift of the ridges of the inner conductor past the projections on the outer conductor in the apparatus of Fig. 1 may be explained by considering that as the ridges and projections move into registry, the electric field between them is intensified because of the increased localized capacitance, which intensification of charge is probably accompanied by increased activity of the field in the grooves between the various ridges and projections, thus intensifying the wave-length shortening effect of these said grooves.

Figs. 2 and 3 illustrate a type of scanning steerable directive antenna which is particularly useful for certain special purposes. As shown in Fig. 2 the antenna system comprises a coaxial-conductor wave guide having an outer conductor 100 and an inner conductor 101, the outer conductor 100 having transverse slots at spaced intervals on one side. If desired, the transverse slots may be approximately a half-wave length long, thus acting as "magnetic dipoles." Two such slots are shown at 102 and 103 in Fig. 3. The inner conductor 101 is provided with a radial projection in the form of a screw thread 104, substantially as shown with respect to the inner conductor 38 of Fig. 1. On the inner side of the outer conductor 100 are provided certain projections 105 adapted to cooperate with the screw thread 104 and the inner conductor 101 to provide a variable shortening of the wave length as the inner conductor 101 is rotated, again as described in connection with Fig. 1.

The slotted modified coaxial conductor wave guide shown in Fig. 3 may be mounted, as shown in Fig. 2, on the side of the fuselage of an airplane. The coaxial-wave guide, shown at 107 is mounted clear of the fuselage, and the fuselage shown generally at 108, is provided with a reflector 109 in the form of a cylindrical paraboloid mounted in the fuselage wall and facing the wave guide 107 which lies in its focal axis, so that the reflector 109 is adapted to provide a certain amount of vertical concentration of the directional characteristics of the slotted wave guide 107. The wave guide 107 is so oriented that the slots are directed toward the reflector 109. Means (not shown) are provided for exciting the wave guide 107 at its left-hand (forward) end and for connecting the wave guide 107 with a suitable transmitter receiver apparatus (not shown). Absorbing material shown generally at 110 is provided in the right-hand end of the wave guide 107 to absorb such power as is not radiated from the antenna during transmission and to mitigate undesired standing waves in the wave guide system. Means are also provided for rotating the inner conductor 101 in order to cause periodic variations of the directional characteristics of the antenna system, such means including the faired bearings 111 and 112, the motor 113 (geared to the inner conductor by means not shown) and the translating device (which may be a potentiometer) 114 which is adapted to provide to the receiver of the radio system (not shown) information concerning the orientation of the directivity pattern of the antenna system.

By virtue of the wave-length-shortening effect provided in accordance with this invention, the wave length in the wave guide 107 will be shorter than the wave lengths of oscillations of the same frequency in free space. This condition is a practical necessity for the production of effective directional antenna characteristics from a series of slots such as the slots 102 and 103, because if the wave length in the wave guide 107 were the same or larger than the wave length in free space there would be interference from higher order beams or "lobes" which would form part of the directivity characteristic of the system. When the wave length in the guide 107 is such that the slots are spaced by the wave length in the guide, the maximum radiation will be in a direction normal to the axis of the guide. If the slotted portion of the guide is of substantial length, an extremely sharp beam may be produced (sharpness being in a plane substantially perpendicular to the axis of the guide, the beam being sent out in such a plane). The spacing between the slots should, as previously suggested, be less than the wave length in free space.

In practice it may be desirable to avoid operation in which the wave length in the guide passes through a value for which the slots are exactly one wave length in the guide apart because for such value of the wave length in the guide the reflections set up by the various slots add up in phase and standing waves of fairly high amplitude exist in the wave guide 107. This condition, however, exists only for a relatively narrow range of values of wave length in the guide in the neighborhood of that just mentioned, so that this phenomenon may actually be used to calibrate continuously the apparatus used, in order to indicate accurately the position of the directive maximum of the antenna system, as noted in the application of L. W. Alvarez, Serial No. 509,790, filed November 10, 1943. It is generally desirable to operate the apparatus in a range over which the spacing between the slots remains less than a wave length in the guide, or possibly reaches equality with a wave length in the guide, only at the extreme portion of the cycle for purposes of check or calibration. If it is desired to center the sweep of the directive characteristics of the antenna system upon the direction perpendicular to the axis of the airplane, the wave guide 107 may be arranged at a small angle to the axis of the airplane, which is quite feasible since the fuselage 108 will normally be narrower towards the rear of the airplane. In general an apparatus such as that shown in Fig. 2 will be mounted on each side of the airplane fuselage and the apparatus will be used for such purposes as detecting the presence of vessels at sea at long distances from a patrolling aircraft, thus greatly extending the area covered by the patrol. Other apparatus of known types could be used on the aircraft for detecting vessels nearer to the course of the patrolling craft.

Various other ways of applying the principles of the present invention for shortening the wave length of oscillations of a given frequency in wave guides of various types and/or for providing adjustability or variability of the wave length in such wave guides for a given frequency of operation are possible within the spirit of the present invention, the scope of which is indicated by the appended claims. It is to be understood that dielectric material may be inserted between the projections of one or both conductors to increase the wave shortening effect as is done in certain embodiments of the parent application.

References to wave length made herein are intended to refer to desired frequencies of operation, at which it is intended that radio-frequency power should be transferred through the wave guide or guides in question. Unless otherwise specified, wave length dimensions refer to the wave length in the particular structure or environment under consideration.

What is claimed is:

1. A coaxial wave guide antenna having inner and outer conductors and having on one of said conductors a plurality of spaced radial projections extending into the space between said conductors and having on the other of said conductors a continuous screw thread also extending into said space.

2. A coaxial wave guide antenna having inner and outer conductors and having on one of said conductors a plurality of spaced radial projections extending into the space between said conductors and having on the other of said conductors a continuous screw thread, also extending into said space, the spacing between adjacent threads being substantially the same as the spacing between adjacent projections.

3. A coaxial wave guide antenna having inner and outer conductors and having on one of said conductors a plurality of spaced radial projections extending into the space between said conductors and having on the other of said conductors a continuous screw thread also extending into said space, said projections on at least one of said coaxial conductors being spaced so that there are more than two of said projections per wave length.

4. A coaxial wave guide antenna having inner and outer conductors and having on one of said conductors a plurality of spaced radial projections extending into the space between said conductors and having on the other of said conductors a continuous screw thread also extending into said space, said inner and outer conductors being rotatable with respect to each other whereby the wave length of oscillations of a given frequency may be varied.

5. A coaxial wave guide antenna having inner and outer conductors and having on one of said conductors a plurality of spaced radial projections extending into the space between said conductors and having on the other of said conductors a continuous screw thread also extending into said space, the spacing between adjacent threads being substantially the same as the spacing between adjacent projection and less than a half wave length, and said inner and outer conductors being rotatable with respect to each other whereby the wave length of oscillations of a given frequency may be varied.

6. A coaxial wave guide having inner and outer conductors and having radial projections on one of said conductors and a helical projection on the other of said conductors.

7. Apparatus in accordance with claim 3 wherein said outer conductor is formed with a plurality of spaced transverse slots.

8. Apparatus in accordance with claim 5, wherein said outer conductor is formed with a plurality of spaced transverse slots.

9. A coaxial wave guide antenna comprising inner and outer conductors, one of said conductors being rotatably mounted relative to the other of said conductors, said outer conductor being formed with a plurality of slots, spaced radial projections on one of said conductors, angularly disposed projections on the other of said conductors and means for rotating said rotatably mounted conductor.

10. A coaxial wave guide antenna having inner and outer conductors and having on one of said conductors a plurality of spaced radial projections extending into the space between said conductors and having on the other of said conductors a continuous screw thread also extending into said space, the spacing between adjacent threads being the same as the spacing between adjacent projections and less than a half wave length, one of said conductors being rotatably mounted relative to the other conductor, said outer conductor being formed with a plurality of spaced transverse slots, and means for rotating said rotatably mounted conductor.

11. A wave guide comprising a hollow first conductor and a second conductor, disposed inside said first conductor in spaced relationship thereto, said conductors being mounted for relative movement such that the longitudinal axes of said two conductors maintain fixed relative positions, one of said conductors being provided with a plurality of transverse radial projections, the other of said two conductors being provided with at least one radial projection disposed at an angle to a transverse plane of said wave guide, said projections on said two conductors extending into the space between said two conductors.

MILTON G. WHITE.

REFERENCES CITED

The following references are of record in the file of this patent:

UNITED STATES PATENTS

| Number | Name | Date |
|---|---|---|
| 2,206,923 | Southworth | July 9, 1940 |
| 2,226,479 | Pupp | Dec. 24, 1940 |
| 2,338,441 | Kohl | Jan. 4, 1944 |
| 2,405,437 | Leeds | Aug. 6, 1946 |
| 2,408,435 | Mason | Oct. 1, 1946 |
| 2,433,368 | Johnson et al. | Dec. 30, 1947 |
| 2,438,367 | Keister | Mar. 23, 1948 |
| 2,438,913 | Hansen | Apr. 6, 1948 |
| 2,460,109 | Southworth | Jan. 25, 1949 |